(12) United States Patent
Stearns et al.

(10) Patent No.: US 11,519,888 B2
(45) Date of Patent: Dec. 6, 2022

(54) SYSTEM AND VALVE FOR LIQUID CHROMATOGRAPHY

(71) Applicant: Valco Instruments Company, Inc., Houston, TX (US)

(72) Inventors: Stanley D. Stearns, Houston, TX (US); Ales Plistil, Houston, TX (US)

(73) Assignee: Valco Instruments Company, Inc., Houston, TX (US)

( * ) Notice: Subject to any disclaimer, the term of this patent is extended or adjusted under 35 U.S.C. 154(b) by 0 days.

(21) Appl. No.: 17/411,488

(22) Filed: Aug. 25, 2021

(65) Prior Publication Data

US 2021/0382019 A1    Dec. 9, 2021

Related U.S. Application Data

(62) Division of application No. 16/281,965, filed on Feb. 21, 2019, now Pat. No. 11,119,076.

(60) Provisional application No. 62/635,029, filed on Feb. 26, 2018.

(51) Int. Cl.
| | | |
|---|---|---|
| *G01N 30/22* | (2006.01) | |
| *G01N 30/20* | (2006.01) | |
| *G01N 30/32* | (2006.01) | |
| *G01N 30/36* | (2006.01) | |
| G01N 30/52 | (2006.01) | |

(52) U.S. Cl.
CPC ............. *G01N 30/36* (2013.01); *G01N 30/20* (2013.01); *G01N 30/22* (2013.01); *G01N 30/32* (2013.01); *G01N 2030/201* (2013.01); *G01N 2030/324* (2013.01); *G01N 2030/326* (2013.01); *G01N 2030/328* (2013.01); *G01N 2030/522* (2013.01)

(58) Field of Classification Search
CPC ........ G01N 30/22; G01N 30/32; G01N 30/36; G01N 2030/522
See application file for complete search history.

(56) References Cited

U.S. PATENT DOCUMENTS

| | | | | |
|---|---|---|---|---|
| 2010/0024906 A1* | 2/2010 | Moeller | ............... | F04B 7/0007 137/565.31 |
| 2019/0211813 A1* | 7/2019 | Yanagibayashi | ...... | F16K 11/074 |

FOREIGN PATENT DOCUMENTS

WO    02/12878 A1    2/2002

OTHER PUBLICATIONS

Meltaus, Johanna, Extended European Search Report for EP App. No. 21194393.1, European Patent Office, dated Dec. 15, 2021, 6 pages, Munich, Germany.

* cited by examiner

*Primary Examiner* — Herbert K Roberts
(74) *Attorney, Agent, or Firm* — Crain, Caton & James, P.C.; James E. Hudson, III

(57) ABSTRACT

Systems for use with liquid chromatography for provision of continuous flow or gradient flow in connection with two pumps providing mobile phase to a valve.

2 Claims, 13 Drawing Sheets

SYSTEM AND VALVE FOR LIQUID CHROMATOGRAPHY

CROSS-REFERENCE TO RELATED APPLICATIONS

This application is a divisional of U.S. Non-provisional application Ser. No. 16/281,965, filed Feb. 21, 2019 for "System and valve for liquid chromatography," which claims the benefit of U.S. Provisional Application No. 62/635,029, filed Feb. 26, 2018.

STATEMENT REGARDING FEDERALLY SPONSORED RESEARCH OR DEVELOPMENT

Not Applicable.

BACKGROUND

1. Field

The present disclosure pertains to systems for use with liquid chromatography for provision of continuous flow or gradient flow in connection with two pumps and a valve. More particularly, the present disclosure pertains to a system to provide for continuous or gradient flow of one or two mobile phases from two pumps, each with a pressure sensor, and a controller in communication with both pumps and both pressure sensors to facilitate dispensing by each pump at a common pressure, through a valve which has multiple positions to facilitate the desired flow. The present disclosure further pertains to such a valve.

2. Description of the Related Art

High performance liquid chromatography (HPLC) is generally performed using pumps, columns and injection valves scaled to deliver fluids at flow rates measured in cubic centimeters of fluid per minute. These components are typically separate and joined together to provide a system for HPLC. Unfortunately, these systems require a mobile phase to be provided at continuous or gradient flow.

Where two mobile phase liquids are used, particularly of differing compressibilities, the proper provision of mobile phase liquids can be difficult, often requiring the addition of fluids with higher compressibilities to account for potential compression from the mobile phase fluid of lower compressibility as pressure is equalized within the system. The provision of the mobile phase, or mobile phases, from each pump at or near a common pressure is necessary for effective flow.

It would therefore be desirable to provide a valve for high performance liquid chromatography which may be used in conjunction with two pumps. It would be further desirable to provide a valve to facilitate such flow.

SUMMARY

The present disclosure therefore meets the above needs and overcomes one or more deficiencies in the prior art by providing systems for continuous or gradient flow for high performance liquid chromatography and associated valves.

The system generally includes a first pump, a second pump, at least a first mobile phase reservoir, and a valve. A second mobile phase reservoir may be provided in some embodiments of the system. The first pump is adapted to provide a first mobile phase to the valve from the first mobile phase reservoir while the second pump is adapted to provide one of a first mobile phase or a second mobile phase to the valve from the associated mobile phase reservoir. A first pump pressure sensor, associated with the first pump, provides measurement of the pressure of the first mobile phase at the valve from the first pump and a second pump pressure sensor, associated with the second pump, provides a measurement of the pressure of the provided first or second mobile phase at the valve from the second pump. A controller is in communication with each sensor and facilitates the provision of the mobile phase from each pump at a common pressure. As a result, the combination of each sensor, which may be separate from each pump or may be integrated therein, with the controller functions as a pressure regulator.

The valve has a stator and a rotor having a common center axis where the stator orifices and rotor slots may be selected for performance. The stator orifices and rotor slots are provided to ensure communication in the various positions of the valve to facilitate the desired flow.

In the first embodiment of the system, intended to provide continuous flow, a first embodiment of the valve is in communication with a first mobile phase reservoir, a first pump, a second pump, a first output, and a second output, and further includes a first pump pressure sensor associated with the first pump, a second pump pressure sensor associated with the second pump, a controller in communication with the first pump, the first pump pressure sensor, the second pump and the second pump pressure sensor, and further includes a mixing tee which combines the first output and the second output of the valve.

In a first embodiment of the valve, where continuous flow is provided, the valve has three positions and a stator and rotor, where the stator has a first stator orifice, a second stator orifice, a third stator orifice, a fourth stator orifice, and a fifth stator orifice, and where the rotor has a first rotor slot and a second rotor slot. With the third stator orifice adapted for communication with a first mobile phase reservoir in communication, the fourth stator orifice adapted for communication with the first pump, the second stator orifice adapted for communication with the second pump, the first stator orifice adapted for association with a first output, and the fifth stator orifice adapted for association with a second output. In this first embodiment of the valve, the first position comprises the fourth stator orifice in communication with the fifth stator orifice via the second rotor slot and the third stator orifice in communication with the second stator orifice via the first rotor slot. The second position comprises the fourth stator orifice in communication with the fifth stator orifice via the second rotor slot and the second stator orifice in communication with the first stator orifice via the first rotor slot. The third position comprises the fourth stator orifice in communication with the third stator orifice via the second rotor slot and the second stator orifice in communication with the first stator orifice via the first rotor slot.

When incorporated in a first embodiment of the system, in the first position the valve permits communication between the first pump and the first output and between the second pump and the first mobile phase reservoir so the first pump may be dispensing while the second pump may be filling. In the second position, the valve continues to permit communication between the first pump and the first output and permits communication between the second pump and the second output so the first pump may be dispensing and the second pump may be dispensing, each as a common pressure as measured by the associated pressure sensor and where pump operation is controlled by the controller to facilitate a common or near-common pressure. In the third position, the valve permits communication between the first pump and the first mobile phase reservoir and between the second pump and second output so the second pump may be dispensing while the first pump may be filling.

In an alterative embodiment of the system, intended for gradient flow, an alternative embodiment of the valve is in communication with a first mobile phase reservoir and with a second mobile phase reservoir, a first pump, a second pump, and an output, and further includes a first pump pressure sensor associated with the first pump, a second pump pressure sensor associated with the second pump, a controller in communication with the first pump, the first pump pressure sensor, the second pump and the second pump pressure sensor.

In the alternative embodiment of the valve, to provide gradient flow, the stator has a first stator orifice, a second stator orifice, a third stator orifice, a fourth stator orifice, and a fifth stator orifice while the rotor has a first rotor slot, a second rotor slot, and a third rotor slot. The second stator orifice is adapted for communication with the first mobile phase reservoir, the third stator orifice is adapted for communication with the first pump, the fourth stator orifice is adapted for communication with the second mobile phase reservoir, the fifth stator orifice is adapted for communication with the second pump, the first stator orifice is adapted for association with an output and the valve is operated among a first position, a second position, and a third position. In the first position, the first stator orifice is in communication with the first rotor slot, the second stator orifice is in communication with the third stator orifice via the second rotor slot, and the fourth stator orifice is in communication with the fifth stator orifice via the third rotor slot. In the second position, the first stator orifice is in communication with the third stator orifice via the first rotor slot, the second stator orifice is in communication with the second rotor slot, the fourth stator orifice is in communication with the third rotor slot, and the fifth stator orifice is in isolation. In the third position, the first stator orifice is in communication with the third stator orifice and the fifth stator orifice via the first rotor slot, the second stator orifice is in isolation, the second rotor slot is in isolation, the fourth stator orifice is in isolation, and the third rotor slot in isolation.

When incorporated in the alternative embodiment of the system, in the first position, the valve permits communication between the first pump and the first mobile phase reservoir so the first pump may be filling and permits communication between the second pump and the second mobile phase reservoir so the second pump may be filling. In the second position, the valve permits communication between the first pump and the output so the first pump may dispense, while the first pump pressure sensor may provide a measurement of the pressure of the first mobile phase provided to the valve, and the second pump may pump the second mobile phase to the valve at the same pressure as the first mobile phase, as measured by the second pump pressure sensor. The operation of the second pump, to match the pressure output of the first pump, is accomplished by the first pump, second pump, first pump pressure sensor, and second pump pressure sensor being in communication with a digital processor or mechanical controller. In the third position, the valve permits communication between the first pump and the output so the first pump may dispense.

In a further alternative embodiment of the system, intended to provide gradient flow, a further alternative embodiment of the valve is in communication with first pump, a second pump, a first mobile phase reservoir, a second mobile phase reservoir, a first output, a second output, and further includes a first pump pressure sensor associated with the first pump, a second pump pressure sensor associated with the second pump, a controller in communication with the first pump, the first pump pressure sensor, the second pump and the second pump pressure sensor, and further includes a mixing tee which combines the first output and the second output of the valve.

In the further alternative embodiment of the valve, the stator has a first stator orifice, a second stator orifice, a third stator orifice, a fourth stator orifice, a fifth stator orifice and a sixth stator orifice while the rotor having a first rotor slot, a second rotor slot, a third rotor slot, and a fourth rotor slot. The first stator orifice is adapted for communication with the first mobile phase reservoir with the second stator orifice adapted for communication with the first pump, the fourth stator orifice adapted for communication with the second mobile phase reservoir, and the fifth stator orifice adapted for communication with the second pump while the third stator orifice is adapted to communicate with a first output and the sixth stator orifice adapted to communicate with a second output. In the further alternative embodiment, the valve is operable among a first position, a second position, and a third position. In the first position, the first stator orifice is in communication with the second stator orifice via the first rotor slot, the third stator orifice is in communication with the second rotor slot, the fourth stator orifice in communication with the fifth stator orifice via the third rotor slot, the sixth stator orifice isolated and the fourth rotor slot isolated. In the second position, the first stator orifice is in communication with the first rotor slot, the second stator orifice and the third stator orifice are in communication with the second rotor slot, the fourth stator orifice is in communication with the third rotor slot, the fifth stator orifice is in isolation, and the sixth stator orifice is in communication with the fourth rotor slot. In the third position, the first stator orifice is in communication with the first rotor slot, the second stator orifice and the third stator orifice are in communication with the second rotor slot, the fourth stator orifice is in communication with the third rotor slot, and the fifth stator orifice is in communication with the sixth stator orifice via the fourth rotor slot.

When incorporated in the alternative embodiment of the system, in the first position of the further alternative embodiment of the valve, valve permits communication between the first pump and the first mobile phase reservoir so the first pump may be filled and the communication between the second pump and the second mobile phase reservoir so the second pump may be filled. In the second position, the valve permits communication between the first pump and the first output, so the pump may be dispensing while the second pump matches pressure according to the first pump pressure sensor and the second pump pressure sensor. The operation of the second pump, to match the pressure output of the first pump, is accomplished by the first pump, second pump, first pump pressure sensor, and second pump pressure sensor being in communication with a digital processor or mechanical controller. In the third position, the valve permits communication between the first pump and the first output and between the second pump and the second output, so the first pump may dispense and the second pump may dispense.

In an additional fourth embodiment, intended to provide continuous flow, an additional embodiment of the valve is in communication with in communication with a first mobile phase reservoir, a first pump, a second pump, a first output, and a second output, and further includes a first pump pressure sensor associated with the first pump, a second pump pressure sensor associated with the second pump, a controller in communication with the first pump, the first pump pressure sensor, the second pump and the second pump pressure sensor, and further includes a mixing tee which combines the first output and the second output of the valve.

In the additional embodiment of the valve, where continuous flow is provided, the valve has eight positions and a stator and a rotor, the stator has a first stator orifice, a second stator orifice, a third stator orifice, a fourth stator orifice, and a fifth stator orifice while the rotor has a first rotor slot and a second rotor slot. In the additional embodiment, the fifth stator orifice is adapted for communication with the first mobile phase reservoir, the first stator orifice is adapted for communication with the first pump, the fourth stator orifice is adapted for communication with the second pump, the second stator orifice is adapted for communication with a first output and the fourth stator orifice is adapted for communication with a second output. The valve of the additional embodiment is operable among eight positions. In the first position the first stator orifice is in communication with the second stator orifice via the first rotor slot, the third stator orifice is isolated, and the fourth stator orifice is in communication with the fifth stator orifice via the second rotor slot. In the second position, the first stator orifice is in communication with the second stator orifice via the first rotor slot, the third stator orifice is isolated, the fourth stator orifice is in communication with the second rotor slot, and the fifth stator orifice is isolated. In the third position, the first stator orifice is in communication with the second stator orifice via the first rotor slot, the third stator orifice is in communication with the fourth stator orifice via the second rotor slot, and the fifth stator orifice is isolated. In the fourth position, the first stator orifice is in communication with the first rotor slot, the second stator orifice is isolated, the third stator orifice is in communication with the fourth stator orifice via the second rotor slot and the fifth stator orifice is isolated. In the fifth position, the first stator orifice is in communication with the fifth stator orifice via the first rotor slot, the second stator orifice is isolated, and the third stator orifice is in communication with the fourth stator orifice via the second rotor slot. In the sixth position, the first stator orifice is in communication with the first rotor slot, the second stator orifice is isolated, the third stator orifice is in communication with the fourth stator orifice via the second rotor slot, and the fifth stator orifice is isolated. In the seventh position, the first stator orifice is in communication with the second stator orifice via the first rotor slot, the third stator orifice is in communication with the fourth stator orifice via the second rotor slot. In the eighth position, the first stator orifice is in communication with the second stator orifice via the first rotor slot, the third stator orifice is isolated, the fourth stator orifice is in communication with the second rotor slot and the fifth stator orifice are isolated.

When incorporated in the additional system for continuous flow, in the first position, the valve permits communication between the first pump and the first output while the first pump may be dispensing a volume at a first pump pressure identified by the first pump pressure sensor and the second pump is in communication with the first mobile phase reservoir and may be filled from empty to full. In the second position, the valve permits communication between the first pump and the first output so the first pump may be dispensing the volume at the first pump pressure while the second pump may be pressurizing up to the first pump pressure as identified by the second pump pressure sensor. In the third position, the valve permits communication between the first pump and the first output so the first pump may be dispensing at the first pump pressure until empty and permits communication between the second pump and the second output so the second pump may be dispensing at the first pump pressure with increasing volume to maintain the volume. In the fourth position, the first pump may be depressurizing while the valve permits communication between the second pump and the second output so the second pump may be dispensing at the first pump pressure to maintain the volume. In the fifth position, the valve permits communication between the first pump and the first mobile phase reservoir so the first pump may be filled from full to empty while the valve permits communication between the second pump and the second output so the second pump may be dispensing at the first pump pressure to maintain the volume. In the sixth position, the first pump may be pressurizing up to the first pump pressure while the valve permits communication between the second pump and the second output so the second pump may be dispensing at the first pump pressure to maintain the volume. In the seventh position, the valve permits communication between the second pump and the second output so the second pump may be dispensing at the first pump pressure until empty and permits communication between the first pump and the first output so the first pump may be dispensing at the first pump pressure with increasing volume to maintain the volume. In the eighth position, the valve permits communication between the first pump and the first output so the first pump may be dispensing at the first pump pressure to maintain the volume while the second pump may be depressurizing.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DESCRIPTION OF THE PREFERRED EMBODIMENT

The system 100 may provide continuous or gradient flow.

Figure 1A:
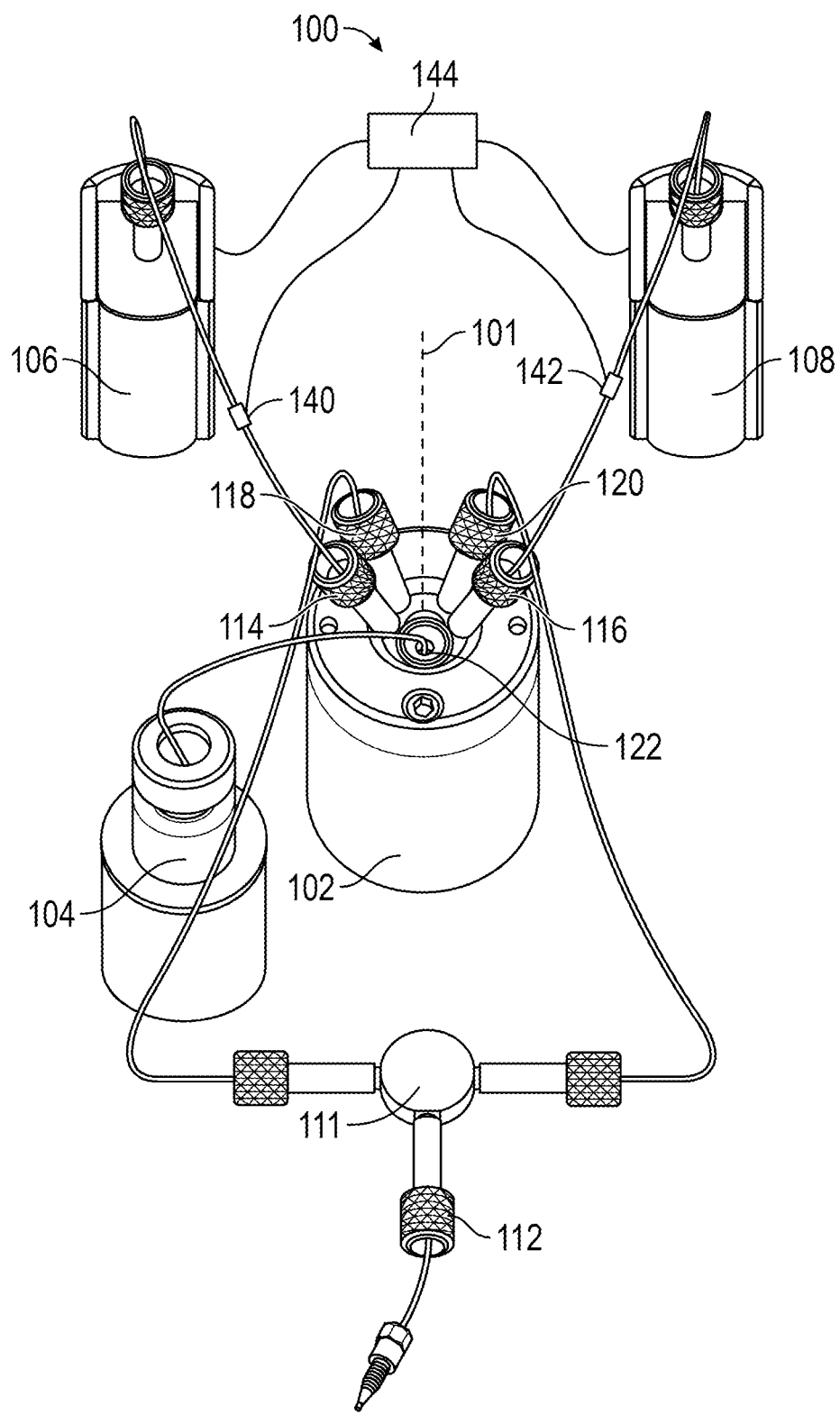
FIG. 1A is an illustration of a system for providing continuous flow, such as the system illustrated in FIGS. 2-5 and as the additional system illustrated in FIGS. 12-19.

Referring to FIG. 1A, an illustration is provided of a system 100, which provides continuous flow using two pumps, a pressure sensor associated with each pump, a single mobile phase reservoir, a controller and a valve. The system 100 includes a valve 102, a mobile phase reservoir 104, a first pump 106, a first pump pressure sensor 140, a second pump 108, a second pump pressure sensor 142, a controller 144, a connecting tee 111, and a mobile phase outlet 112. While one pump pressure sensor provides a measurement of the pressure of the mobile phase provided to the valve from one pump, the other pump provides the mobile phase to the valve at or near the same pressure, as measured by the second pump pressure sensor, accomplished by the first pump, the second pump, the first pump pressure sensor and the second pump pressure sensor in communication with a digital processor or mechanical controller. The provision of mobile phase at a common pressure eliminates the issues of relative compressibility between the mobile phases and the need to increase the volume of a mobile phase with a higher compressibility between introduction to chromatographic analytical equipment. The first pump 106 communicates with the valve 102 at a first pump port 114 while the second pump 108 communicates with the valve 102 at a second pump port 116. The valve 102 communicates with the mobile phase reservoir 104 at a mobile phase reservoir port 122. A first mobile phase outlet port 118 and a second mobile phase outlet port 120 are provided on the valve 102, wherein the associated tubing is connected with the connecting tee 111 to provide the single mobile phase outlet 112. The valve 102 includes a stator and rotor therein where the stator orifices and rotor slots communicate to provide the mobile phase in continuous flow, which may be constructed as illustrated in the system of FIGS. 2-5 and in the additional system of FIGS. 12-17. Within the valve 102, a rotor is rotatable with respect to a stator about the centerpoint as the rotor and stator have a common center axis 101.

Figure 1B:
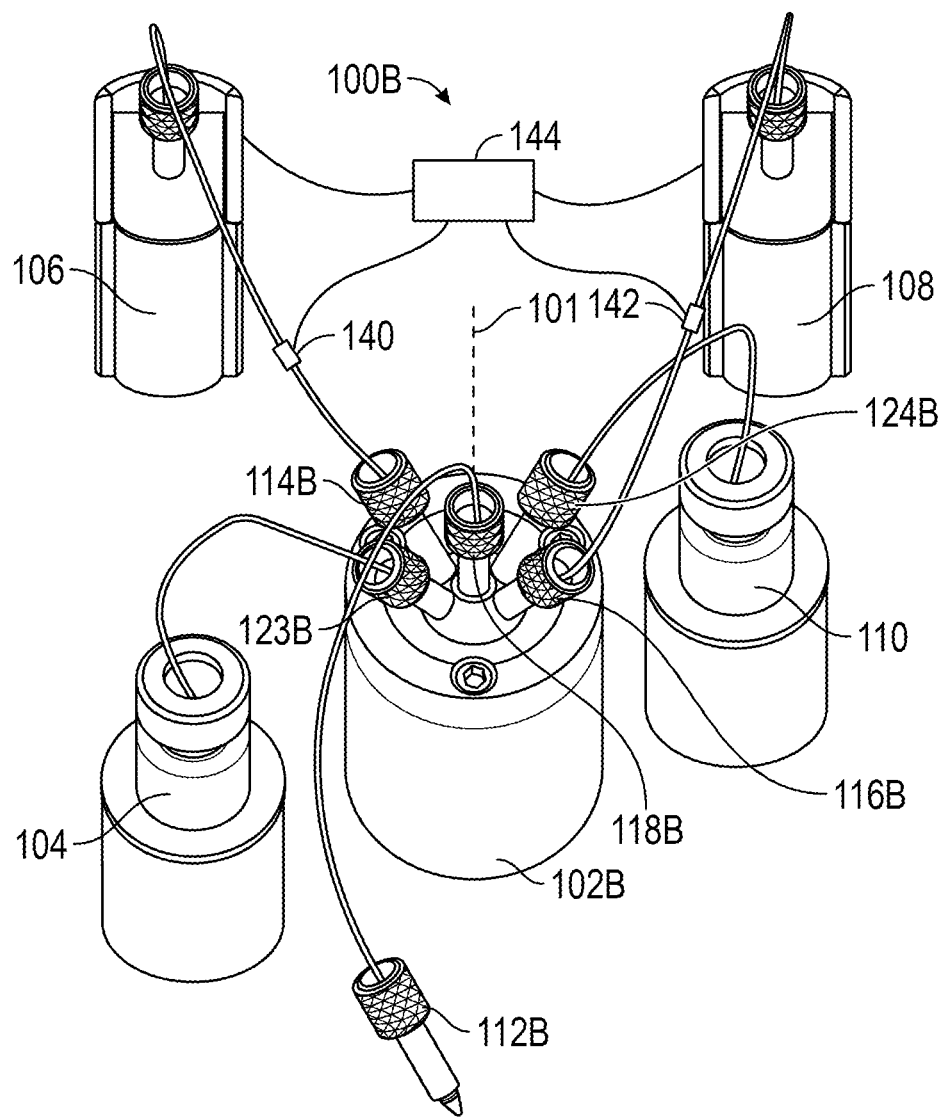
FIG. 1B is an illustration of an alternative system, providing gradient flow, as further illustrated in FIGS. 6-8.
Figure 6:
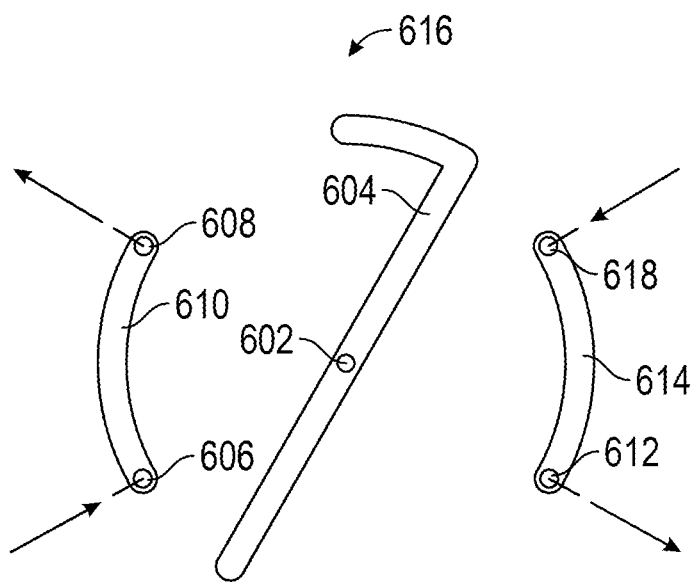
FIG. 6. is an illustration of a stator and rotor relationship for a gradient system using two pumps in a position where a first pump is filling and a second pump is filling associated with the alternative system for providing gradient flow illustrated in FIG. 1B.
Figure 7:
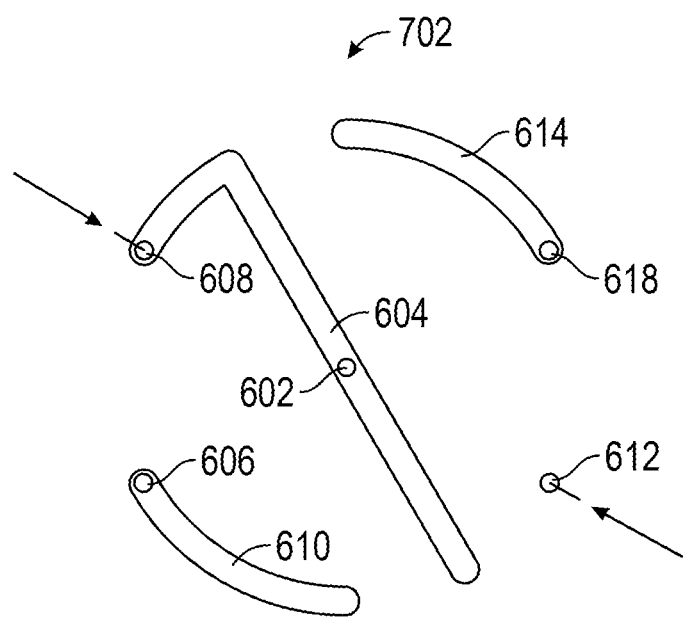
FIG. 7 is an illustration of a stator and rotor relationship for a gradient system using two pumps where the output from a first pump, alone, is dispensed, while the output from a second pump is held and potentially pressurized associated with the alternative system for providing gradient flow illustrated in FIG. 1B.
Figure 8:
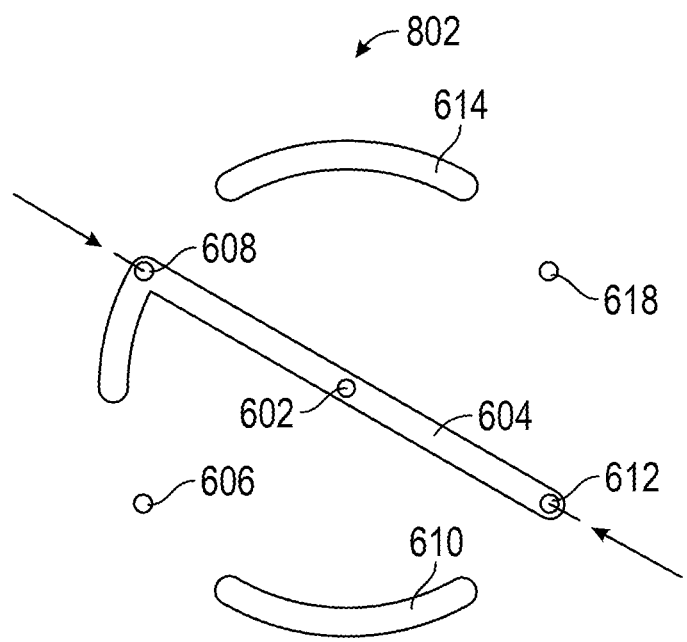
FIG. 8 is an illustration of a stator and rotor relationship for a gradient system using two pumps where the output from a first pump and the output from a second pump are simultaneously dispensed from the valve associated with the alternative system for providing gradient flow illustrated in FIG. 1B.

Referring to FIG. 1B, an illustration is provided of an alternative system 100B which provides gradient flow using two pumps, two mobile phase reservoirs, and a valve. The system 100B includes a valve 102B, a first mobile phase reservoir 104, a second mobile phase reservoir 110 a first pump 106, a first pump pressure sensor 140, a second pump 108, a second pump pressure sensor 142, a controller 144, and a mobile phase outlet 112B. While one pump pressure sensor provides a measurement of the pressure of the mobile phase provided to the valve from one pump, the other pump provides the mobile phase to the valve at or near the same pressure, as measured by the second pump pressure sensor, accomplished by the first pump, the second pump, the first pump pressure sensor and the second pump pressure sensor in communication with a digital processor or mechanical controller. The first pump 106 communicates with the valve 102B at a first pump port 114B while the second pump 108 communicates with the valve 102B at a second pump port 116B. The first mobile phase reservoir 104 communicates with the valve 102B at a first mobile phase port 123B while the second mobile phase reservoir 110 communicates with the valve 102B at a second mobile phase port 124B. A mobile phase outlet port 118B is provided on the valve connected to the single mobile phase outlet 112B. The valve 102B includes a stator and rotor therein where the orifices and slots communicate to provide the mobile phase in continuous flow, as illustrated in FIGS. 6-8. Within the valve 102B, a rotor is rotatable with respect to a stator about the centerpoint as the rotor and stator have a common center axis 101.

Figure 1C:
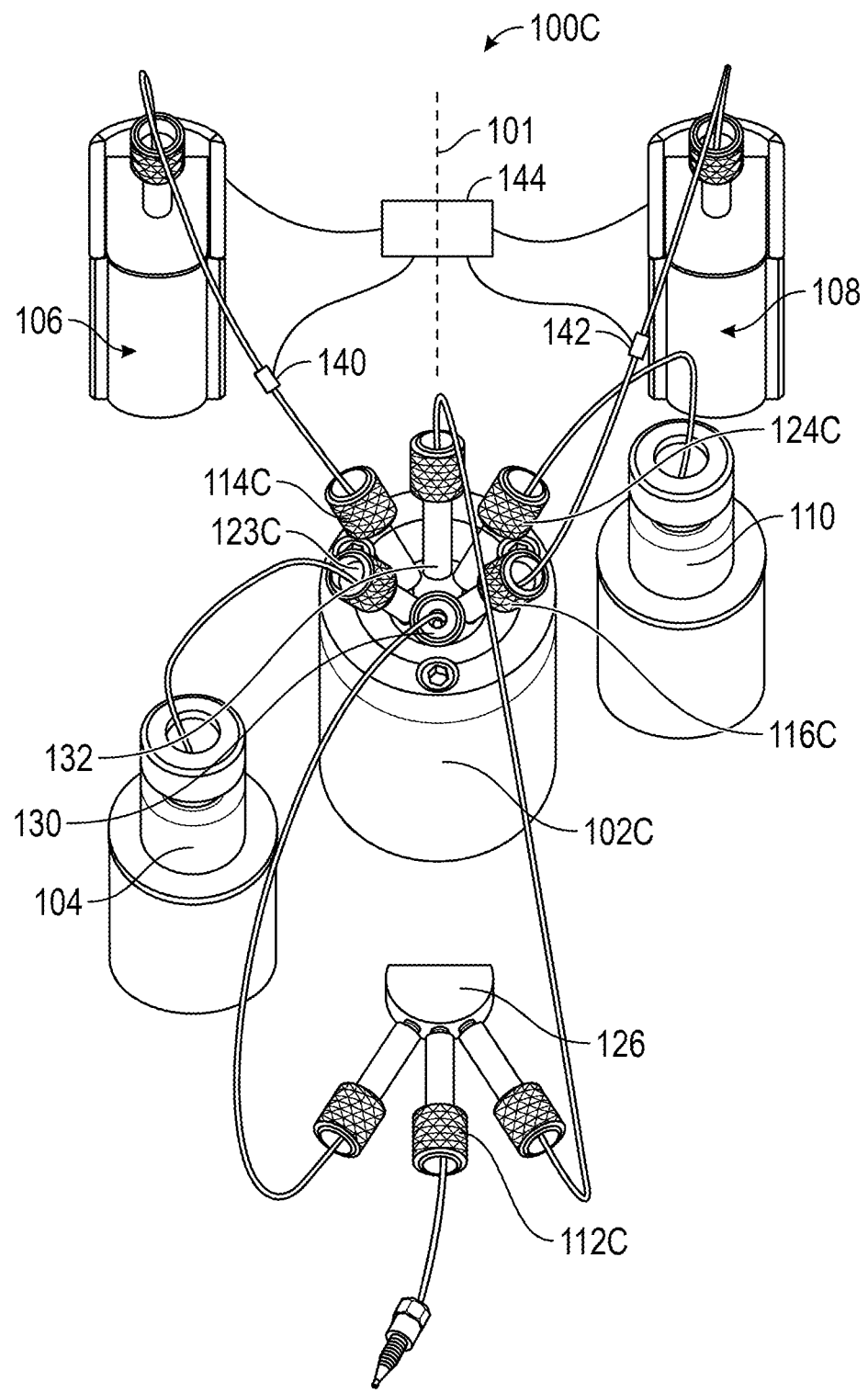
FIG. 1C is an illustration of a further alternative system, providing gradient flow, as further illustrated in FIGS. 9-11.
Figure 9:
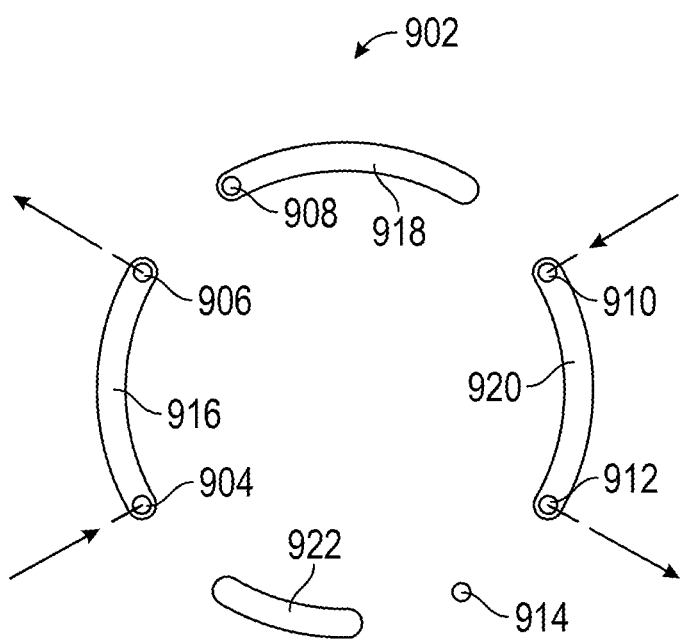
FIG. 9. is an illustration of an alternative stator and rotor relationship for a gradient system using two pumps in a position where a first pump is filling and a second pump is filling associated with the further alternative system for providing gradient flow illustrated in FIG. 1C.
Figure 10:
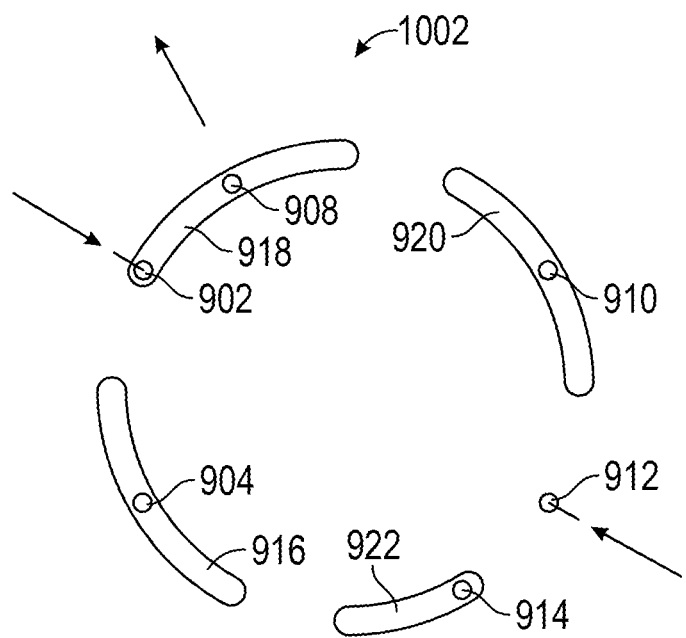
FIG. 10 is an illustration of an alternative stator and rotor relationship for a gradient system using two pumps where the output from a first pump, alone, is dispensed, while the output from a second pump is held and potentially pressurized associated with the further alternative system for providing gradient flow illustrated in FIG. 1C.
Figure 11:
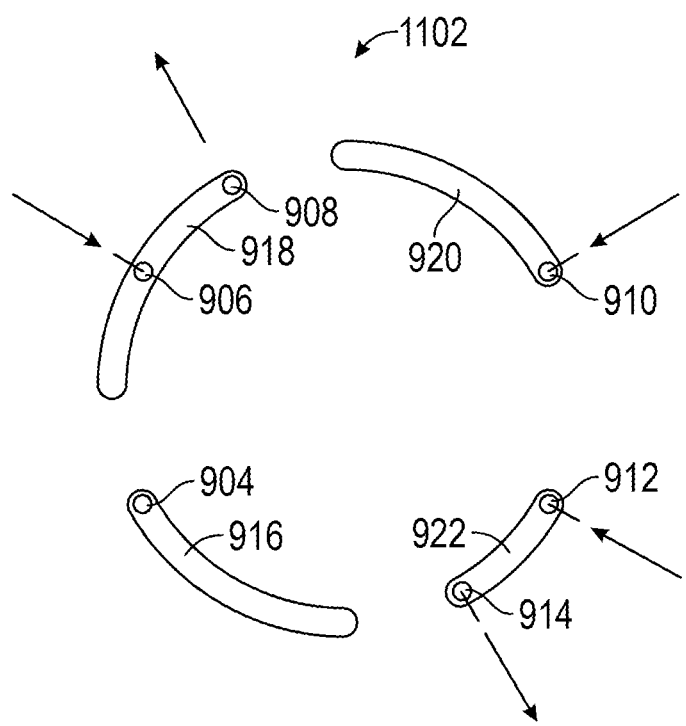
FIG. 11 is an illustration of an alternative stator and rotor relationship for a gradient system using two pumps where the output from a first pump and the output from a second pump are simultaneously dispensed from the valve associated with the further alternative system for providing gradient flow illustrated in FIG. 1C.

Referring to FIG. 1C, an illustration is provided of one system 100C which provides gradient flow using two pumps, two mobile phase reservoirs, a valve, and mixing tee. The system 100C includes a valve 102C, a first mobile phase reservoir 104, a second mobile phase reservoir 110, a first pump 106, a first pump pressure sensor 140, a second pump 108, a second pump pressure sensor 142, a controller 144, and a mobile phase outlet 112C in communication with a mixing tee 126. Each of the first pump 106 and the second pump 108 provide mobile phase at a common pressure and may be associated with a sensor to identify the associated pressure, which may be altered by control of the associated pump. The first pump 106 communicates with the valve 102C at a first pump port 114C while the second pump 108 communicates with the valve 102C at a second pump port 116C. The first mobile phase reservoir 104 communicates with the valve 102C at a first mobile phase port 123C while the second mobile phase reservoir 110 communicates with the valve 102C at a second mobile phase port 124C. A second outlet port 130 is provided on the valve 102C and connected to the mixing tee 126, as is a first outlet port 132. The mixing tee 126 is connected to the connected to the single mobile phase outlet 112C. The valve 102C includes a stator and rotor therein where the orifices and slots communicate to provide the mobile phase in continuous flow, as illustrated in FIGS. 9-11. Within the valve 102C, a rotor is rotatable with respect to a stator about the centerpoint as the rotor and stator have a common center axis 101.

Notably, the present disclosure is not only capable of pumping small volumes, and at high pressures, but also capable of providing continuous flow or a gradient system application, which permits substantially faster operation that conventional applications.

Within the valve 102C, a rotor is rotatable with respect to a stator about the centerpoint as the rotor and stator have a common center axis 101.

The stator and rotor combinations, positions and output illustrated in FIGS. 2-5 are associated with the system 100 illustrated in FIG. 1A for continuous flow.

Figure 2:
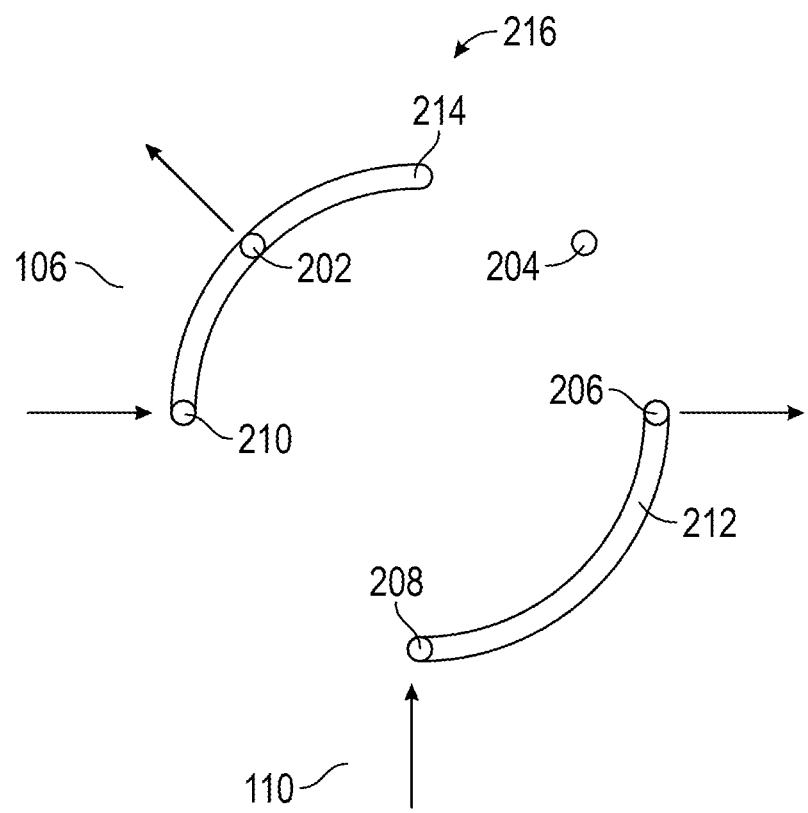
FIG. 2 is an illustration of a stator and rotor relationship for continuous flow using two pumps in a first position wherein the output of a first pump is being dispensed while a second pump is filling associated with the system for providing continuous flow illustrated in FIG. 1A.

Referring to FIG. 2, an illustration is provided of a stator and rotor relationship of the system for continuous flow illustrated in FIG. 1A using the first pump 106 and the second pump 108 in a first position 216 wherein the output of the first pump 106 is being dispensed while a second pump 108 is filling from a single first mobile phase reservoir 104. The first position 216 may also be identified as the home position. The stator has a first stator orifice 204, a second stator orifice 206, a third stator orifice 208, a fourth stator orifice 210, and a fifth stator orifice 202. The rotor has a first rotor slot 212 and a second rotor slot 214. The first stator orifice 204 is in communication with the second output port 120 to the mobile phase outlet 112. The second stator orifice 206 is in communication with the second pump 108 at the second pump port 116 mobile phase outlet. The third stator orifice 208 is in communication with the first mobile phase reservoir 104 at the mobile phase reservoir port 122. The fourth stator orifice 210 is in communication with the first pump 106 via a first pump port 114. The fifth stator orifice 202 is also in communication with first output port 118 to the chromatographic equipment. In the first position 216, the first rotor slot 212 provides communication with both the second stator orifice 206 and the third stator orifice 208, permitting the filling of the second pump 108 from the first mobile phase reservoir 104 while the second rotor slot 214 provides communication from the first pump port 114 to the output port 118. In this first position 216, the first pump 106 is dispensing at a present pressure while the second pump 108 is filling. The pressure of the first mobile phase is measured at the first pump pressure sensor 140, which may be external the first pump 106 and intermediate the first pump 106 and the valve 102.

Figure 3:
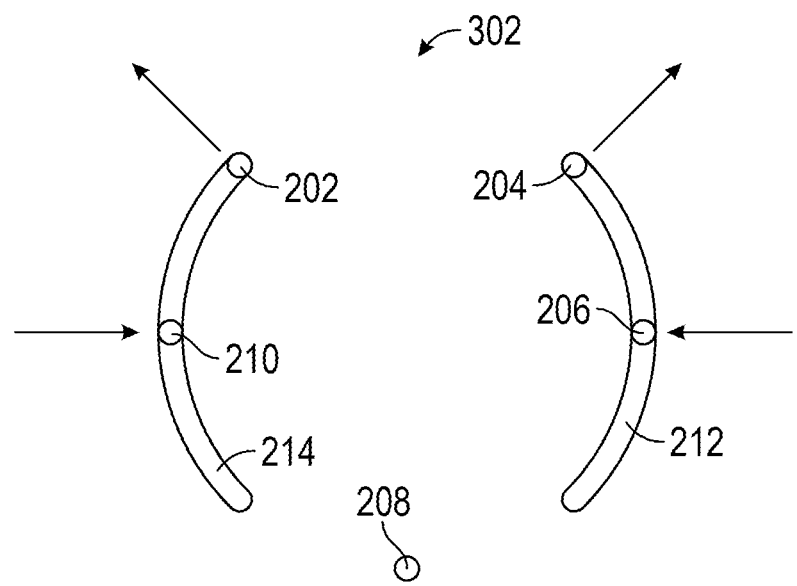
FIG. 3 is an illustration of a stator and rotor relationship for continuous flow using two pumps in a second position wherein the output of a first pump and of a second pump are being dispensed associated with the system for providing continuous flow illustrated in FIG. 1A.

Referring to FIG. 3, an illustration is provided of the stator and rotor relationship of the system for continuous flow illustrated in FIG. 1A using two pumps in a second position 302 wherein the output of the first pump 106 and the second pump 108 dispensing. This second position 302 may be provided at a 45 degree counterclockwise rotation. In the second position 302, the first rotor slot 212 provides communication with both the first stator orifice 204 and the second stator orifice 206, permitting the outflow from the second pump 108 at the second pump port 116 to the output port 120 while the second rotor slot 214 provides communication from the first pump port 114 to the output port 118 by connecting the fourth stator orifice 210 and the fifth stator orifice 202. Critically, the first pump 106 and the second pump 108 are dispensing at a common pressure, generally the pressure measured when the system associated with first position 216, and thus eliminating issues with compressibility of the mobile phase. While the first pump 106 continues dispensing at pressure identified by the first pump pressure sensor 140, the second pump 108 is controlled by the controller 144, which may be mechanical, electrical or computerized, to dispense at the common pressure. The controller 144 may be a single processor or may be distributed with components associated with each pump 106, 108. In this second position 302, the outflow of the first pump 106 may be decreasing or increasing while the outflow of the second pump 106 is likewise increasing or decreasing Referring to FIG. 4, an illustration is provided of the stator and rotor relationship of the system for continuous flow illustrated in FIG. 1A using two pumps in a third position 402 wherein the first pump 106 is being filled while the output from the second pump 108 is being dispensed at the preset pressure. This third position 402 may be provided at a 90 degree counterclockwise rotation from the home position. In the third position 402, the first rotor slot 212 provides communication with both the first stator orifice 204 and the second stator orifice 206, permitting the outflow from the second pump 108 at the second pump port 116 to the output port 120 while the second rotor slot 214 provides communication from the first pump 106 at the first pump port 114 and the first mobile phase reservoir 104 at the first mobile phase reservoir port 122 by providing communication between the third stator orifice 208 and the fourth stator orifice 210.

Figure 4:
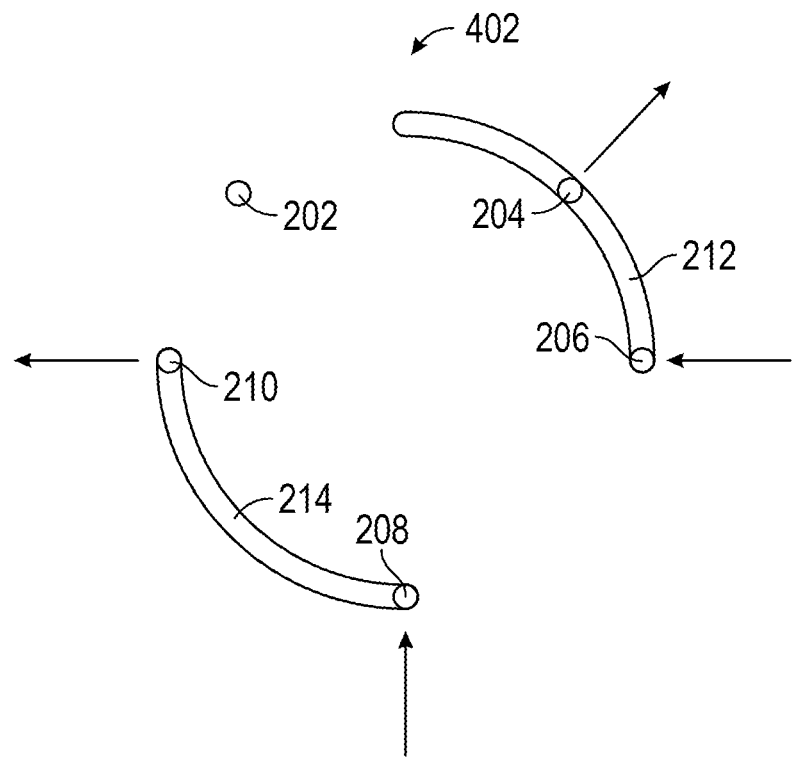
FIG. 4 is an illustration of a stator and rotor relationship for continuous flow using two pumps in a third position wherein a first pump is filling while the output from a second pump is being dispensed associated with the system for providing continuous flow illustrated in FIG. 1A.
Figure 5:
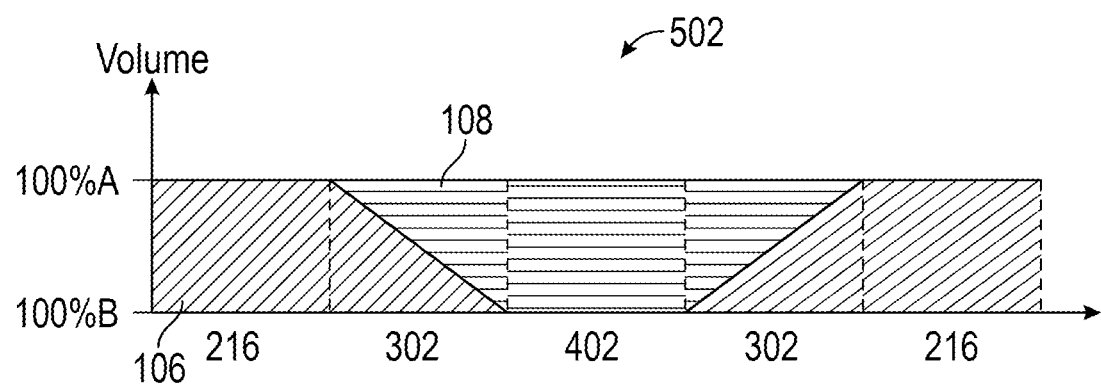
FIG. 5 is a diagram of the relative output from the value in the three positions with the input from a first pump and of a second pump over time as illustrated of FIGS. 2-4, associated with the system for providing continuous flow illustrated in FIG. 1A.

Referring to FIG. 5, a diagram 502 is provided of the relative output from the valve 100 in the three positions with the input from a first pump and of a second pump over time as illustrated in FIGS. 2-4 for the system for continuous flow illustrated in FIG. 1A. In operation in the system 100, the valve 102 cycles sequentially from the first position (where the first pump 106 provides the 100% of the volume), to the second position (where the outflow from the first pump 106 is decreasing and the outflow from the second pump 108 is added to maintain 100% of volume), to the third position (where the second pump 108 provides 100% of the volume), back to the second position (but where the outflow from the second pump 108 is decreasing and the outflow from the first pump 106 is added to maintain 100% of volume), whereafter the cycle repeats.

Referring to FIG. 6, an illustration is provided of a stator and rotor relationship for the alternative system providing gradient flow illustrated in FIG. 1B using two pumps in an alternative system gradient flow first position 616 where a first pump is filling and a second pump is filling, which may also be characterized as the gradient home position. In the alternative system providing gradient flow, the stator includes a first stator orifice 602, a second stator orifice 606, a third stator orifice 608, a fourth stator orifice 618, and a fifth stator orifice 612. The rotor includes a first rotor slot 604, a second rotor slot 610, and a third rotor slot 614. The first mobile phase reservoir 104 is in communication at the first mobile phase reservoir port 123B with the second stator orifice 606 and first pump port 114B is in communication with the third stator orifice 608. The second mobile phase reservoir 110 is in communication at the second mobile phase reservoir port 124B with the fourth stator orifice 618 while the second pump 108 at the second pump port 116B is in communication with the fifth stator orifice 612. In the gradient system first position 616, both the first pump 106 and the second pump 108 are filing. The second stator orifice 606 is in communication with the third stator orifice 608 via the second rotor slot 610 so the first pump 106 may draw from the first mobile phase reservoir 104. The fourth stator orifice 618 is in communication with the fifth stator orifice 612 via the third rotor slot 614 so the second pump 108 may draw from the second mobile phase reservoir 110.

Referring to FIG. 7, an illustration is provided of the stator and rotor relationship for the alternative system providing gradient flow using two pumps in a gradient system second position 702 where the output from a first pump, alone, is dispensed, while the output from a second pump is held and potentially brought to the pressure of the first pump. This alternative gradient system second position 702 may be positioned at a 60 degree counterclockwise rotation from the gradient system first position 616. In the gradient system second position 702, the first stator orifice 602 is in communication with an output port 118B via the first rotor slot 604 which permits the first pump 106 to dispense at a first pump pressure pressure to the third stator orifice 608. The second pump 108 may be brought up to or near to the first pump pressure. The pressure of the first mobile phase provided by the first pump 106 is measured at the first pump pressure sensor 140 while the pressure of the second mobile phase provided by the second pump 108 is measured by the second pump pressure sensor 142, and the two compared and operation of the second pump 108 altered by the controller 144. The second pump pressure sensor 142 may be external the second pump 108 and intermediate the second pump 108 and the valve 102.

Referring to FIG. 8, an illustration is provided of a stator and rotor relationship for the alternative system providing gradient flow in a third position 802 using two pumps where the output from a first pump and the output from a second pump are simultaneously dispensed from the valve 100B. This gradient system third position 802 may be a 90 degree counterclockwise rotation from the gradient system first position 612. Once the pressure supplied from the first pump 106 has stabilized, and the pressure to be supplied from the second pump 108 matches, the valve 100B may be moved to the gradient system third position 802, so the first mobile phase and second mobile phase flow to the first stator orifice 602 and continue to flow together to the output port 118B. In the gradient system third position 802, the third stator orifice 608 and the fifth stator orifice 612 are in communication via the first rotor slot 604 with the first stator orifice 602, which is in communication with the output port 118B, providing the output for the first pump 106 and the second pump 108, operating at a common pressure. While the first pump 106 continues dispensing at the pressure identified by the first pump pressure sensor 140, the second pump 108 is controlled by the controller 144, which may be mechanical, electrical or computerized, to dispense at the common pressure.

Referring to FIG. 9, an illustration is provided of a stator and rotor relationship for a further alternative system for gradient flow illustrated in FIG. 1C using two pumps in an further alternative gradient first position 902 where a first pump 106 is filling and a second pump 108 is filling. This further alternative gradient first position 902 may also be characterized as the alternative gradient home position. The further alternative gradient system provides for a shorter distance between valve 100C and any chromatographic analysis equipment, such as a column, at the output port 114, and therefore less fluid volume, between a mixing tee 126 and the chromatographic analysis equipment. Each of the first pump 106 and the second pump 108 are filling with mobile phase. In the further alternative gradient system, the stator includes a first stator orifice 904, a second stator orifice 906, a third stator orifice 908, a fourth stator orifice 910, a fifth stator orifice 912, and a sixth stator orifice 914. The rotor includes a first rotor slot 916, a second rotor slot 918, a third rotor slot 920, and a fourth rotor slot 922. The first mobile phase reservoir 104 is in communication at the first mobile phase reservoir port 123C with the first stator orifice 904 and the first pump 106 is in communication at the first pump port 114C with the second stator orifice 906, which are in communication via the first rotor slot 916. The second mobile phase reservoir 110 is in communication at the second mobile phase reservoir port 124C with the fourth stator orifice 910 while the second pump 108 is in communication at the second pump port 116C with the fifth stator orifice 912, which are in communication via the third rotor slot 920. The third stator orifice 908 is in communication with the first output port 132 and the sixth stator orifice 914 is in communication with the second output port 130. In the further alternative gradient system first position 902, each of the first pump 106 and the second pump 108 are filling. The first stator orifice 904 is in communication with the second stator orifice 906 via the first rotor slot 916. The fourth stator orifice 910 is in communication with the fifth stator orifice 912 via the third rotor slot 920.

Referring to FIG. 10, an illustration is provided of the stator and rotor relationship for the further alternative system for gradient flow illustrated in FIG. 1C in a further alternative gradient second position 1002 using two pumps where the output from a first pump 106, alone, is dispensed, while the output from a second pump 108 is held and may be pressurized to the first pump pressure. This alternative gradient second position 1002 may be 30 degree counterclockwise rotation from the alternative gradient first position 902. Thus, the first pump 106 provides flow, such that the first mobile phase is flowing from the first pump 106 to the first output port 132, and may do so while the pressure is rising at inception. While the first pump 106 is dispensing, the associated pressure is identified by the first pump pressure sensor 140. The pressure generated by the second pump 108, which provides no flow, is adjusted to approach or match the associated pressure of the first pump 106. In the alternative gradient second position 1002, the second stator orifice 906 is in communication with the third stator orifice 908 via the second rotor slot 918, and the fifth stator orifice 912 is isolated.

FIG. 11 is an illustration of the stator and rotor relationship of the further alternative system for providing gradient flow using two pumps in an further alternative gradient system third position 1102 where the output from a first pump 106 and the output from the second pump 108 are simultaneously dispensed from the valve 102C. This alternative gradient third position 1102 may be 30 degree counterclockwise rotation from the alternative gradient second position 1002. The pressure of the first pump 106 is monitored by use of the first pump pressure sensor 140, and the pressure to be supplied from the second pump 108, as measured by the second pump pressure sensor 142, is adjusted to match, or follow, the associated pressure, the valve 102C may be moved to the further alternative gradient system third position 1102, so the first mobile phase is directed to the first output port 132 from a port associated with the third stator orifice 908 and then to a mixing tee 126, and so the second mobile phase is directed to the second output port 130 from a port associated with the sixth stator orifice 914, and then to a mixing tee 126, where the two mobile phases are mixed. In the further alternative gradient system third position 1102, the second stator orifice 906 is in communication with the third stator orifice 908, and therefore the first output port 132, via the second rotor slot 918, while the fifth stator orifice 912 is in communication with the sixth stator orifice 914, and therefore the output port 126, via the fourth rotor slot 922. Each of the first pump 106 and the second pump 108 provide mobile phase at the associated pressure of the first pump 106, controlled by controller 144.

Figure 12:
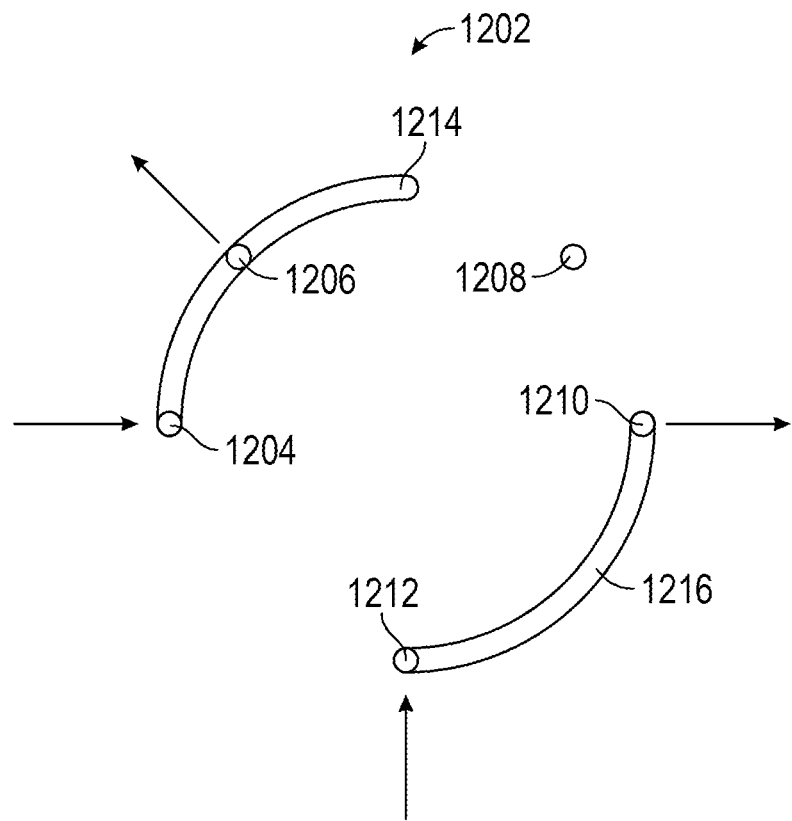
FIG. 12 is an illustration of an additional stator and rotor relationship for continuous flow using two pumps in a first position wherein the output of a first pump is being dispensed while a second pump is filling associated with the additional system for providing continuous flow illustrated in FIG. 1A.

Referring to FIG. 12 an illustration is provided of the stator and rotor relationship for the additional continuous flow system illustrated in FIG. 1A using two pumps in an additional continuous flow system first position 1202 wherein the output of the first pump 106 is being dispensed while the second pump 108 is filling with the second mobile phase. This additional system for continuous flow first position 1202 may also be characterized as the additional continuous flow system home position. The stator has a first stator orifice 1204, a second stator orifice 1206, a third stator orifice 1208, and a fourth stator orifice 1210, and a fifth stator orifice 1212. The rotor has a first rotor slot 1214 and a second rotor slot 1216. The first stator orifice 1204 is in communication with the first pump port 114. The second stator orifice 1206 is in communication with the first mobile phase output port 118. The third stator orifice 1208 is in communication with the second mobile phase output port 120. The fourth stator orifice 1210 is in communication with the second pump 108 at the second pump port 116. The fifth stator orifice 1212 is in communication with the first mobile phase reservoir 104 at the first mobile phase reservoir port 105. No second mobile phase reservoir 110 is needed. In the additional continuous flow first position 1202, the output from the first pump 106 is provided to the first pump port 114 and out the first mobile phase outlet port 118 by the communication of the first stator orifice 1204 with the second stator orifice 1206 via the first rotor slot 1214 while the second pump 108 is filled with a first mobile phase by the communication of the fifth stator orifice 1212 and the fourth stator orifice 1210 via the second rotor slot 1216.

Figure 13:
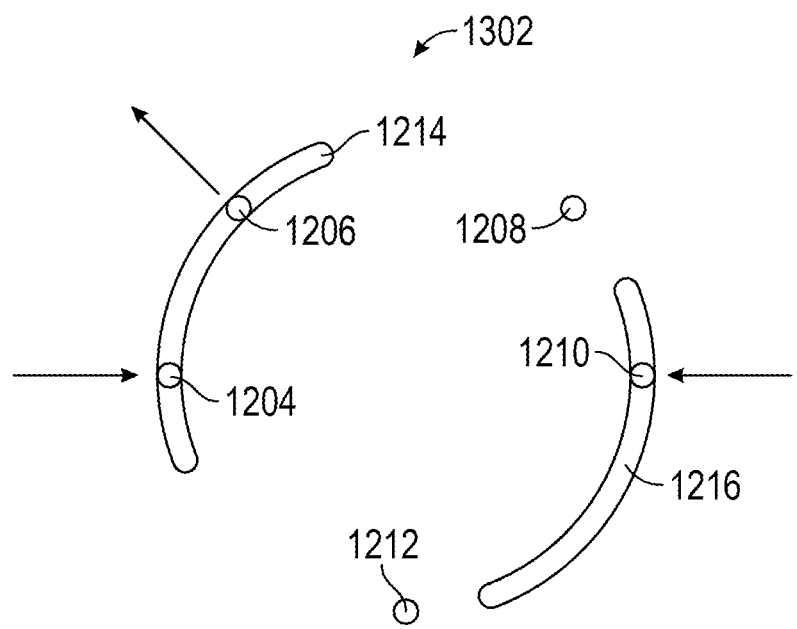
FIG. 13 is an illustration of the additional stator and rotor relationship for continuous flow using two pumps in a second position wherein the output of a first pump is being dispensed while a second pump is pressuring to follow or match the pressure of the first pump associated with the additional system for providing continuous flow illustrated in FIG. 1A.

Referring to FIG. 13 an illustration is provided of the stator and rotor relationship for the additional continuous flow system illustrated in FIG. 1A using two pumps in an additional continuous flow system second position 1302 wherein the output of a first pump 106 is being dispensed and the associated pressure of the first pump 106 is measured by the first pump pressure sensor 140 while the second pump 108 is operated to provide the second mobile phase at a pressure approaching the associated pressure of the first pump 106 by measurement from the second pump pressure sensor 142, as controlled by the controller 144. The pressure from the second pump 108 follows the increasing pressure from the first pump 106. This additional continuous flow system second position 1302 may be a 22.5 degree counterclockwise rotation from the additional continuous flow system first position 1202. In the additional continuous flow second position 1302, the output from the first pump 106 at the first pump port 114 is provided by the communication of the first stator orifice 1204 with the second stator orifice 1206 via the first rotor slot 1214 while the pressure of the outflow from the second pump 108 is matched to the pressure of the outflow from the first pump 106 by operation of the second pump 108 where the associated fourth stator orifice 1210 is in communication only with the second rotor slot 1216.

Figure 14:
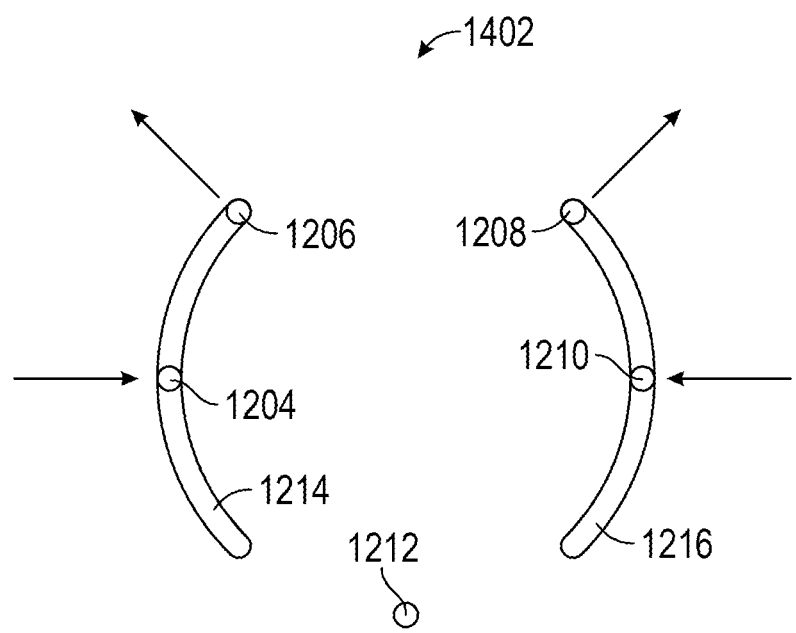
FIG. 14 is an illustration of the additional stator and rotor relationship for continuous flow using two pumps in a third position wherein the output of a first pump and a second pump are being dispensed associated with the additional system for providing continuous flow illustrated in FIG. 1A.

Referring to FIG. 14 an illustration is provided of the stator and rotor relationship for the additional continuous flow system illustrated in FIG. 1A using two pumps in the additional continuous flow system third position 1402 wherein the output of a first pump 106 and the second pump 108 are being dispensed. This additional continuous flow system third position 1402 may be a 45 degree counterclockwise rotation from the additional continuous flow system first position 1202. In the additional continuous flow third position 1402, the balance of the decreasing output from the first pump 106 at the first pump port 114 is provided to the first mobile phase outlet port 118 by the communication of the first stator orifice 1204 with the second stator orifice 1206 by the first rotor slot 1214 while the output from the second pump 108 at the second pump port 116 is provided to the second mobile phase output port 120 by the communication of the fourth stator orifice 1210 with the third stator orifice 1208 via the second rotor slot 1216 while maintaining a constant volumetric output while increasing the output from the second pump 108.

Figure 15:
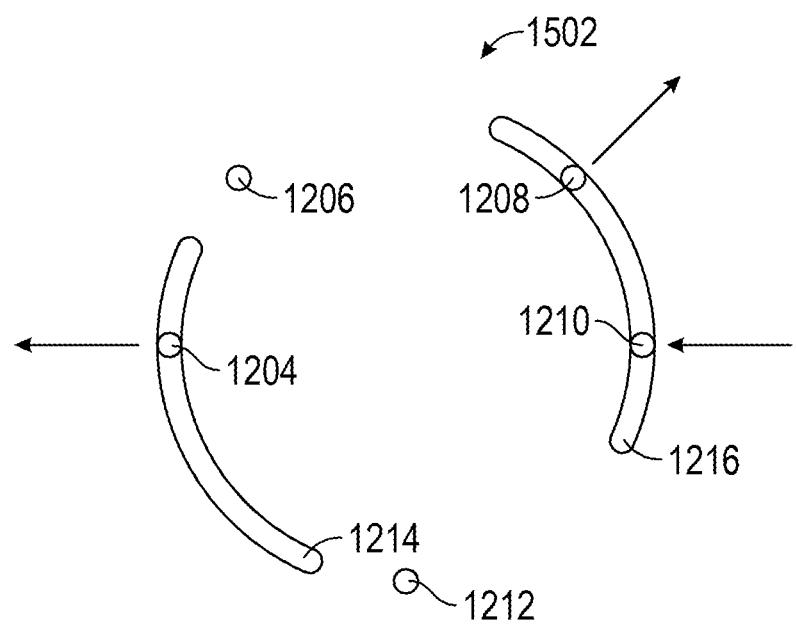
FIG. 15 is an illustration of the additional stator and rotor relationship for continuous flow using two pumps in a fourth position wherein the first pump is depressurizing while the second part is dispensing associated with the additional system for providing continuous flow illustrated in FIG. 1A.

Referring to FIG. 15, an illustration is provided of the stator and rotor relationship for the additional continuous flow system illustrated in FIG. 1A using two pumps in the additional continuous flow system fourth position 1502 wherein the second pump 108 is being dispensed and the first pump 106 is being depressurized before filling. This additional continuous flow system fourth position 1502 may be a 67.5 degree counterclockwise rotation from the additional continuous flow system first position 1202. In the additional continuous flow fourth position 1502, the first pump 106 is in communication with the first rotor slot 1214 but to no other port, while the output from the second pump 108 at the second pump port 116 is provided to the second mobile phase output port 120 by the communication of the fourth stator orifice 1210 with the third stator orifice 1208 via the second rotor slot 1216.

Figure 16:
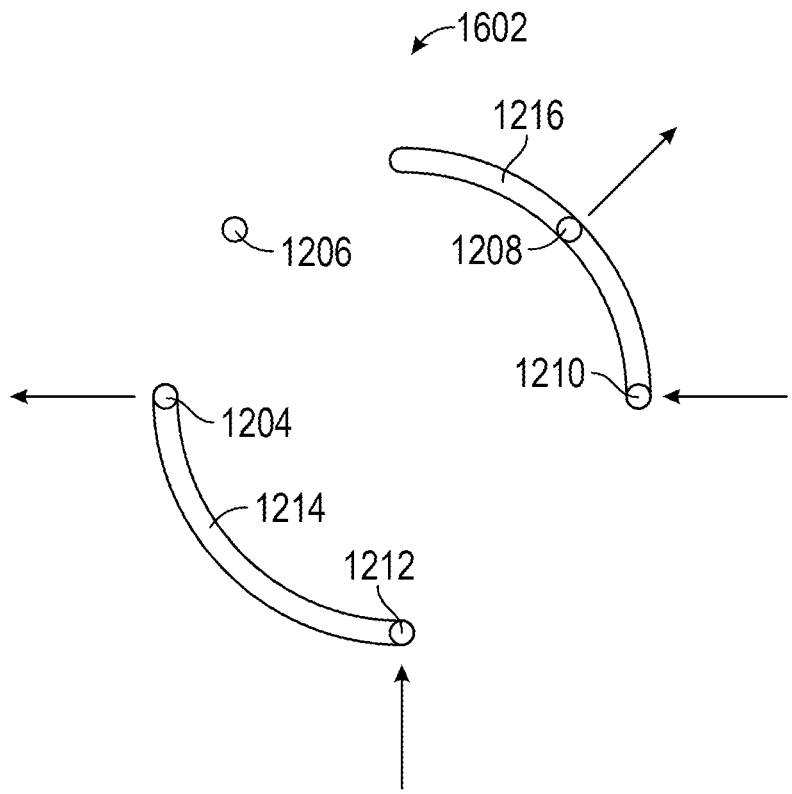
FIG. 16 is an illustration of the additional stator and rotor relationship for continuous flow using two pumps in a fifth position wherein a first pump is filling while the output of a second pump is being dispensed associated with the additional system for providing continuous flow illustrated in FIG. 1A.

Referring to FIG. 16 an illustration is provided of a stator and rotor relationship for the additional continuous flow system illustrated in FIG. 1A using two pumps in an additional continuous flow system fifth position 1602 wherein a first pump 106 is filling while the output of the second pump 108 is being dispensed. This additional continuous flow system fifth position 1602 may be a 90 degree rotation from the additional continuous flow system first position 1202. In the additional continuous flow fifth position 1602, the first pump 106 is filled with a first mobile phase by the communication of the fifth stator orifice 1212 and the first stator orifice 1204 via the first rotor slot 1214 while the output from the second pump 108 at the second pump port 116 is provided to the output 114 by the communication of the third stator orifice 1208 with the fourth stator orifice 1210 via the second rotor slot 1216.

Figure 17:
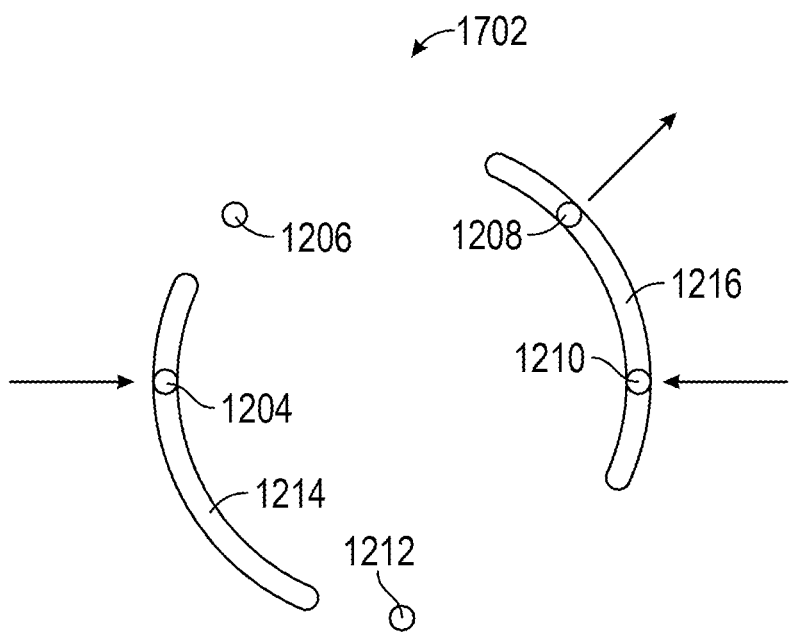
FIG. 17 is an illustration of the additional stator and rotor relationship for continuous flow using two pumps in a sixth position wherein a first pump is pressuring the first mobile phase while the output of a second pump is being dispensed associated with the additional system for providing continuous flow illustrated in FIG. 1A.

Referring to FIG. 17 an illustration is provided of a stator and rotor relationship for the additional continuous flow system illustrated in FIG. 1A using two pumps in an additional continuous flow system sixth position 1702 wherein the first pump 106 is pressuring the first mobile phase while the output of the second pump 108 at the second pump port 116 is being dispensed. This additional continuous flow system sixth position 1702 may be a 67.5 degree clockwise rotation from the additional continuous flow system first position 1202 and 22.5 degree clockwise rotation from previous position 1602. The associated first stator orifice 1204 is in communication only with the first rotor slot 1214 while the output from the second pump 108 at the second pump port 116 is provided to the second mobile phase output port 120 by the communication of the third stator orifice 1208 with the fourth stator orifice 1210 via the second rotor slot 1216.

Figure 18:
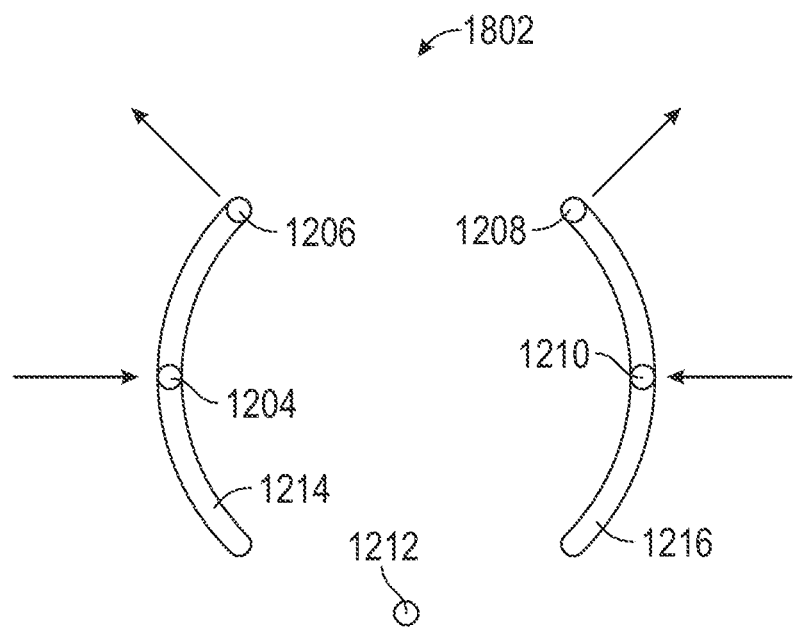
FIG. 18 is an illustration of the additional stator and rotor relationship for continuous flow using two pumps in a seventh position wherein the first pump and the second pump is dispensing associated with the additional system for providing continuous flow illustrated in FIG. 1A.

Referring to FIG. 18 an illustration is provided of the stator and rotor relationship for the additional continuous flow system illustrated in FIG. 1A using two pumps in the additional continuous flow system seventh position 1802 wherein the output of a first pump 106 and the second pump 108 are being dispensed. This additional continuous flow system seventh position 1802 may be a 45 degree counterclockwise rotation from the additional continuous flow system first position 1202 and a 22.5 degree clockwise rotation from previous position 1702. In the additional continuous flow seventh position 1802, the balance of the increasing output from the first pump 106 at the first pump port 114 is provided to the first mobile phase outlet port 118 by the communication of the first stator orifice 1204 with the second stator orifice 1206 by the first rotor slot 1214 while the decreasing output from the second pump 108 at the second pump port 116 is provided to the second mobile phase output port 120 by the communication of the fourth stator orifice 1210 with the third stator orifice 1208 via the second rotor slot 1216. The associated pressure of the first pump 106 is measured by the first pump pressure sensor 140 while the second pump 108 is operated to provide the second mobile phase at a pressure approaching the associated pressure of the first pump 106 by measurement from the second pump pressure sensor 142, as controlled by the controller 144. The pressure from the second pump 108 follows the increasing pressure from the first pump 106.

Figure 19:
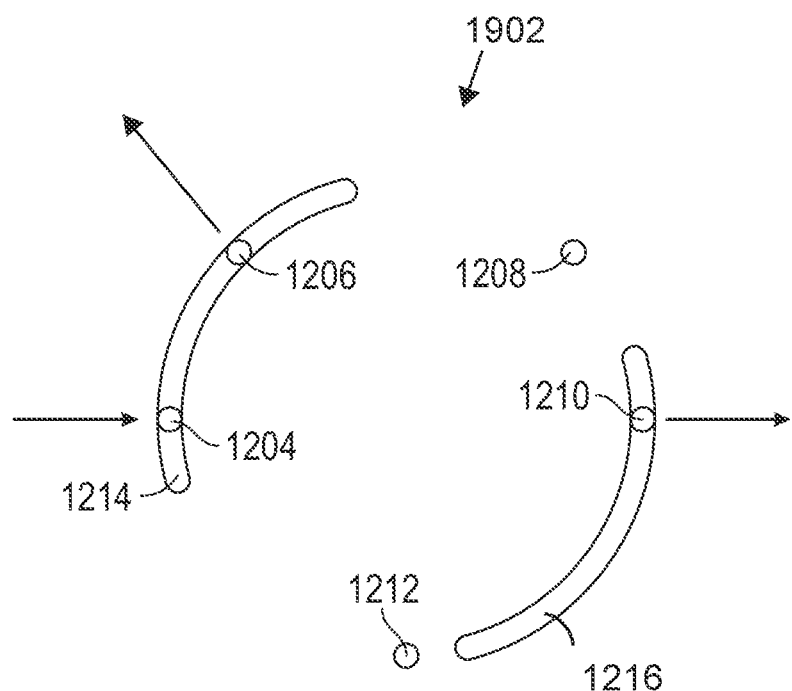
FIG. 19 is an illustration of the additional stator and rotor relationship for continuous flow using two pumps in an eighth position wherein the first pump is dispensing while the second pump is depressurizing associated with the additional system for providing continuous flow illustrated in FIG. 1A.

Referring to FIG. 19, an illustration is provided of the stator and rotor relationship for the additional continuous flow system illustrated in FIG. 1A using two pumps in the additional continuous flow system eighth position 1902 wherein the first pump 106 is being dispensed and the second pump 108 is being depressurized before filling. This additional continuous flow system eighth position 1902 may be a 22.5 degree counterclockwise rotation from the additional continuous flow system first position 1202 and a 22.5 degree clockwise rotation from previous position 1802. In the additional continuous flow eighth position 1902, the first pump 106 provides output to the first mobile phase output port 118 by communication of the first stator portion 1204 to the second stator port 1206 via the first rotor slot 1214, while the second pump is depressurizing in communication with the fourth stator port but to no other port, and the second rotor slot 1216.

Figure 20:
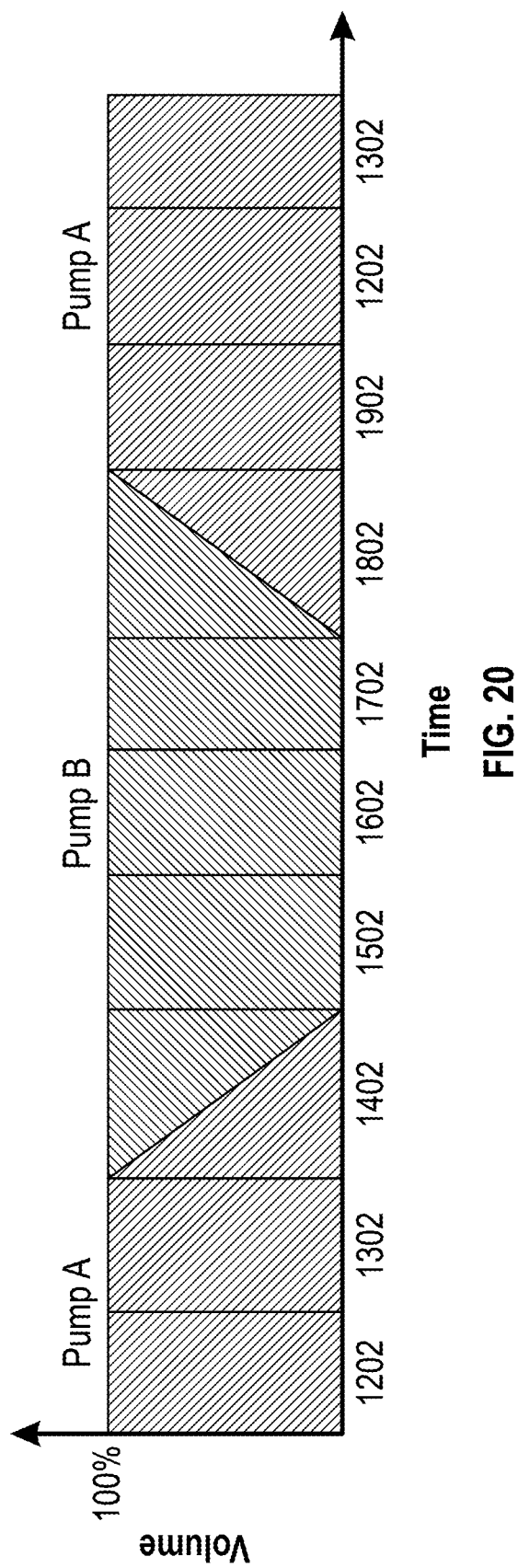
FIG. 20 is an illustration of the relative outflow of the two pumps during operation in the continuous flow associated with the additional system for providing continuous flow illustrated in FIG. 1A.

Referring to FIG. 20 an illustration 2002 is provided of the relative outflow of the first pump 106 and the second pump 108 during operation in the additional continuous flow system depicted in FIGS. 12-19. During operation of additional continuous flow system, the combination of the first pump 106 and the second pump 108 provides a continuous flow at one hundred percent (100%) of volume. Because of the complimentary operation of the first pump 106 and the second pump 108, the volume of first pump 106 and second pump 108 are at inverse positions on the y-axis. The additional continuous flow system operates sequentially through the various positions from the first position 1202 to the last position 1902. As illustrated in FIG. 20, the first pump 106 provides 100% of volume during the first position 1202 and second position 1302, while in the third position 1402, the volume of flow from the first pump 106 is decreased while the volume of flow from the second pump 108 is inversely increased to maintain 100% of volume. Similarly, the second pump 108 provides 100% of volume during the fourth position 1502, fifth position 1602, and sixth position 1702, while in the seventh position 1802, the volume of flow from the second pump 108 is decreased while the volume of flow from the first pump 106 is inversely increased to maintain 100% of volume. Thereafter, during the eighth position 1902, the first pump 106 is again at 100% output.

In all systems, the first pump 106 and the second pump 108 are controller to operate consistent with the position of the valve 102, 102B, 103C where each of the first pump 106, second pump 108, and value 102, 102B, 102C are associated with an actuator which is in turn controlled and powered by an external system, such as a processor, to ensure pump operation is consistent with valve position.

The terms and expressions which have been employed in the foregoing specification are used therein as terms of description and not of limitation, and there is no intention, in the use of such terms and expressions, of excluding equivalents of the features shown and described or portions thereof.

We claim:

1. A system for continuous flow for high performance liquid chromatography comprising:
a first pump;
a controller;
a first pump pressure sensor, the first pump pressure sensor in communication with the first pump and the controller;
a second pump;
a second pump pressure sensor, the second pump pressure sensor in communication with the second pump and the controller;
a first mobile phase reservoir; and
a valve;
the first pump adapted to provide a first mobile phase to the valve from the first mobile phase reservoir;
the second pump adapted to provide the first mobile phase to the valve from the first mobile phase reservoir;
the valve having a stator and a rotor having a common center axis,
the stator having a first stator orifice, a second stator orifice, a third stator orifice, a fourth stator orifice, and a fifth stator orifice;
the rotor having a first rotor slot and a second rotor slot;
the first mobile phase reservoir in communication with the fifth stator orifice;
the first pump in communication with the first stator orifice;
the second pump in communication with the fourth stator orifice;
the second stator orifice associated with a first output;
the fourth stator orifice associated with a second output;
wherein the valve is operable among
a first position where the first pump is capable of dispensing a volume at a first pump pressure identified by the first pump pressure sensor and the second pump is capable of being filled from empty to full,
a second position where the first pump is capable of dispensing the volume at the first pump pressure and the second pump is capable of pressurizing up to the first pump pressure as identified by the second pump pressure sensor,
a third position where the first pump is capable of dispensing at the first pump pressure until empty and the second pump is capable of dispensing at the first pump pressure with increasing volume to maintain the volume,
a fourth position where the first pump is capable of depressurizing and the second pump is capable of dispensing at the first pump pressure to maintain the volume,
a fifth position where the first pump is capable of being filled from full to empty and the second pump is capable of dispensing at the first pump pressure to maintain the volume,
a sixth position where the first pump is capable of pressurizing up to the first pump pressure and the second pump is capable of dispensing at the first pump pressure to maintain the volume,
a seventh position where the second pump is capable of dispensing at the first pump pressure until empty and the first pump is capable of dispensing at the first pump pressure with increasing volume to maintain the volume, and
an eighth position where the first pump is capable of dispensing at the first pump pressure to maintain the volume and the second pump is capable of depressurizing;

the first position comprising:
the first stator orifice in communication with the second stator orifice via the first rotor slot, the third stator orifice in isolation, and the fourth stator orifice in communication with the fifth stator orifice via the second rotor slot;

the second position comprising:
the first stator orifice in communication with the second stator orifice via the first rotor slot, the third stator orifice in isolation, the fourth stator orifice in communication with the second rotor slot, and the fifth stator orifice in isolation;

the third position comprising:
the first stator orifice in communication with the second stator orifice via the first rotor slot, the third stator orifice in communication with the fourth stator orifice via the second rotor slot, and the fifth stator orifice in isolation;

the fourth position comprising:
the first stator orifice in communication with the first rotor slot, the second stator orifice in isolation, the third stator orifice in communication with the fourth stator orifice via the second rotor slot and the fifth stator orifice in isolation;

the fifth position comprising:
the first stator orifice in communication with the fifth stator orifice via the first rotor slot,
the second stator orifice in isolation, and the third stator orifice in communication with the fourth stator orifice via the second rotor slot;

the sixth position comprising:
the first stator orifice in communication with the first rotor slot, the second stator orifice in isolation, the third stator orifice in communication with the fourth stator orifice via the second rotor slot, and the fifth stator orifice in isolation;

the seventh position comprising:
the first stator orifice in communication with the second stator orifice via the first rotor slot, the third stator orifice in communication with the fourth stator orifice via the second rotor slot; and the eighth position comprising:
the first stator orifice in communication with the second stator orifice via the first rotor slot, the third stator orifice in isolation, the fourth stator orifice in communication with the second rotor slot and the fifth stator orifice in isolation.

2. A valve for continuous flow for high performance liquid chromatography comprising:
a stator and a rotor having a common center axis,
the stator having a first stator orifice, a second stator orifice, a third stator orifice, a fourth stator orifice, and a fifth stator orifice;
the rotor having a first rotor slot and a second rotor slot;
wherein the valve is operable among a first position, a second position, a third position, a fourth position, a fifth position, a sixth position, a seventh position, and an eighth position;

the first position comprising:
the first stator orifice in communication with the second stator orifice via the first rotor slot, the third stator orifice in isolation, and the fourth stator orifice in communication with the fifth stator orifice via the second rotor slot;
the second position comprising:
the first stator orifice in communication with the second stator orifice via the first rotor slot, the third stator orifice in isolation, the fourth stator orifice in communication with the second rotor slot, and the fifth stator orifice in isolation;
the third position comprising:
the first stator orifice in communication with the second stator orifice via the first rotor slot, the third stator orifice in communication with the fourth stator orifice via the second rotor slot, and the fifth stator orifice in isolation;
the fourth position comprising:
the first stator orifice in communication with the first rotor slot, the second stator orifice in isolation, the third stator orifice in communication with the fourth stator orifice via the second rotor slot and the fifth stator orifice in isolation;
the fifth position comprising:
the first stator orifice in communication with the fifth stator orifice via the first rotor slot,
the second stator orifice in isolation, and the third stator orifice in communication with the fourth stator orifice via the second rotor slot;
the sixth position comprising:
the first stator orifice in communication with the first rotor slot, the second stator orifice in isolation, the third stator orifice in communication with the fourth stator orifice via the second rotor slot, and the fifth stator orifice in isolation;
the seventh position comprising:
the first stator orifice in communication with the second stator orifice via the first rotor slot, the third stator orifice in communication with the fourth stator orifice via the second rotor slot; and
the eighth position comprising:
the first stator orifice in communication with the second stator orifice via the first rotor slot, the third stator orifice in isolation, the fourth stator orifice in communication with the second rotor slot and the fifth stator orifice in isolation.

* * * * *